United States Patent [19]

Engelbrecht

[11] Patent Number: 5,125,675
[45] Date of Patent: Jun. 30, 1992

[54] TROLLEY

[76] Inventor: Jan C. Engelbrecht, 43 3rd Street, Linden, Johannesburg, Transvaal, South Africa

[21] Appl. No.: 559,059

[22] Filed: Jul. 30, 1990

[30] Foreign Application Priority Data

Jul. 28, 1989 [ZA] South Africa ............... 89/5774
Aug. 7, 1989 [ZA] South Africa ............... 89/6005

[51] Int. Cl.⁵ ............................................. B62B 1/12
[52] U.S. Cl. ................................ 280/37; 280/652; 280/47.26; 229/164
[58] Field of Search .............. 280/639, 37, 651, 652, 280/47.17, 47.18, 47.24, 47.26; 229/164, DIG. 4, DIG. 8, DIG. 6

[56] References Cited

U.S. PATENT DOCUMENTS

| | | | |
|---|---|---|---|
| 3,135,527 | 6/1964 | Knapp | 280/652 |
| 3,285,620 | 11/1966 | Mitty et al. | 280/47.26 |
| 3,292,942 | 12/1966 | Mitty et al. | 280/47.26 |
| 3,427,040 | 2/1969 | Jenkins | 280/652 |
| 4,123,077 | 10/1978 | Joseph | 280/33.991 |

FOREIGN PATENT DOCUMENTS 965360 9/1950 France ............... 280/652

Primary Examiner—Andres Kashnikow
Assistant Examiner—Richard Camby

[57] ABSTRACT

The trolley has a collapsible structure composed of rigid or semi-rigid, typically cardboard panels. The panels can be folded relative to one another between a collapsed state in which the majority of them lie in compact, coplanar relationship and an erected state in which they define an open-topped box. A wheeled axle is connected to the structure to permit the box to wheeled over the ground. Handles are provided for carrying the structure when collapsed and for steering the trolley when erected. Also, tabs are provided that lock in suitable slots to maintain the collapsed and erected condition of the panels.

16 Claims, 3 Drawing Sheets

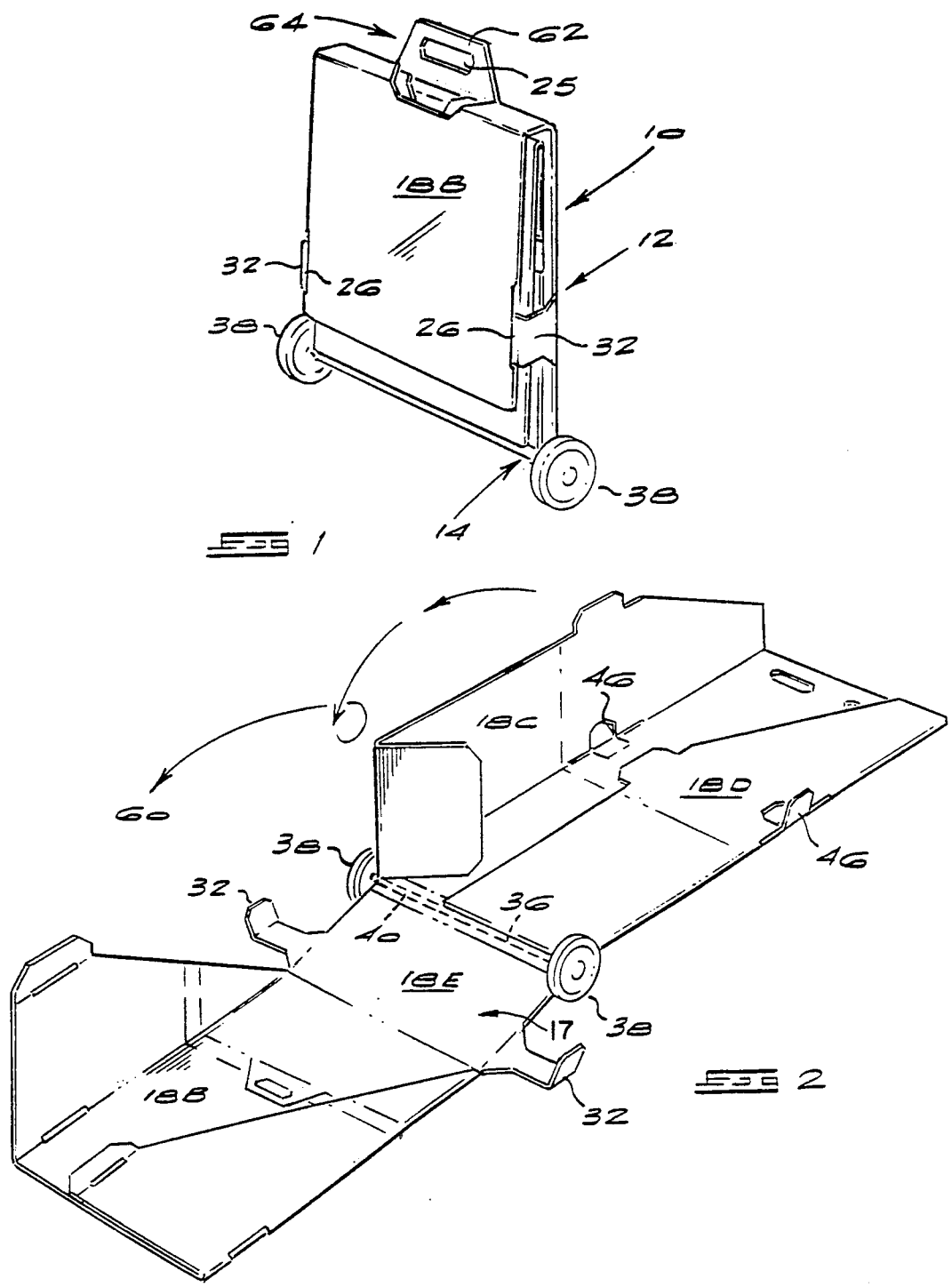

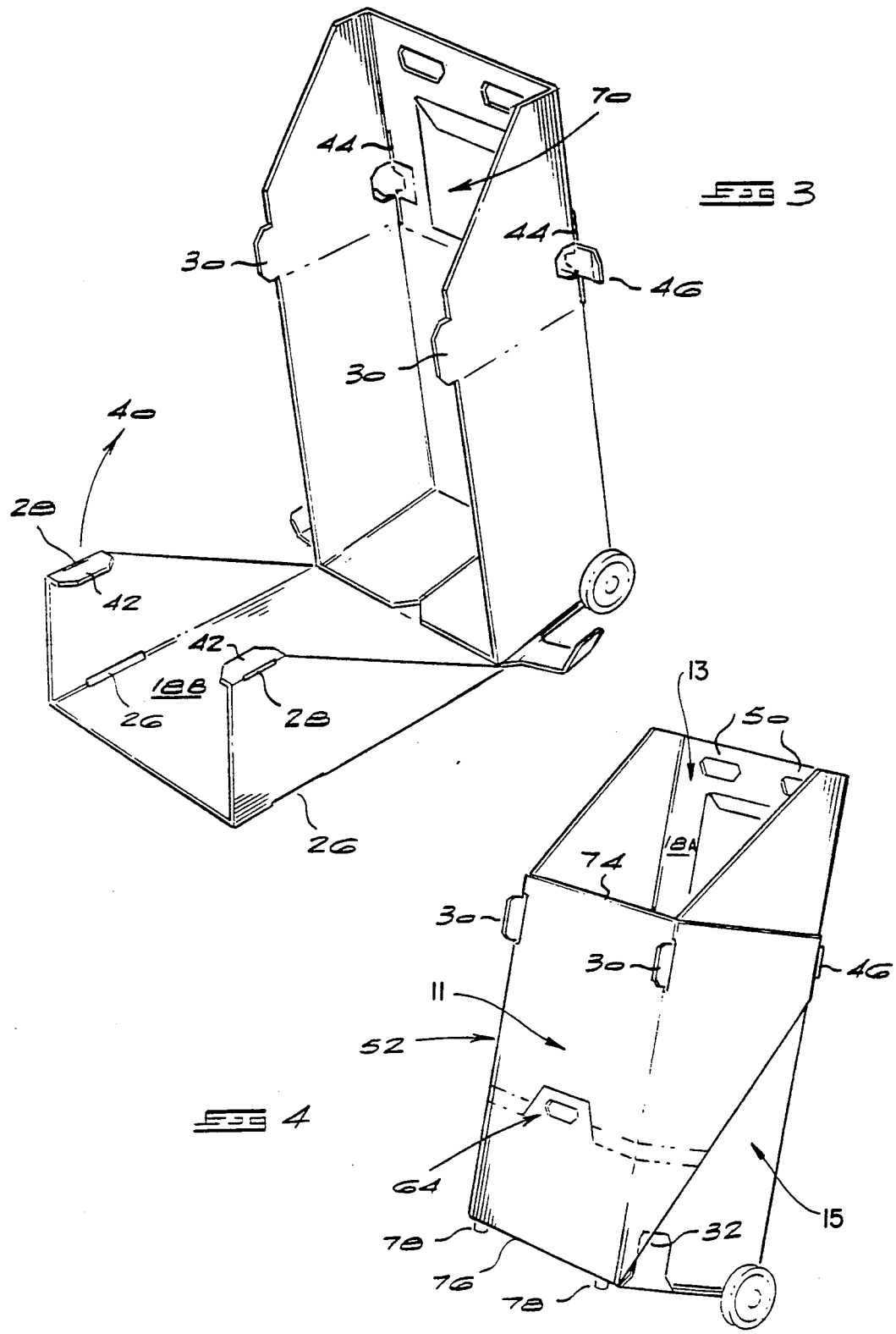

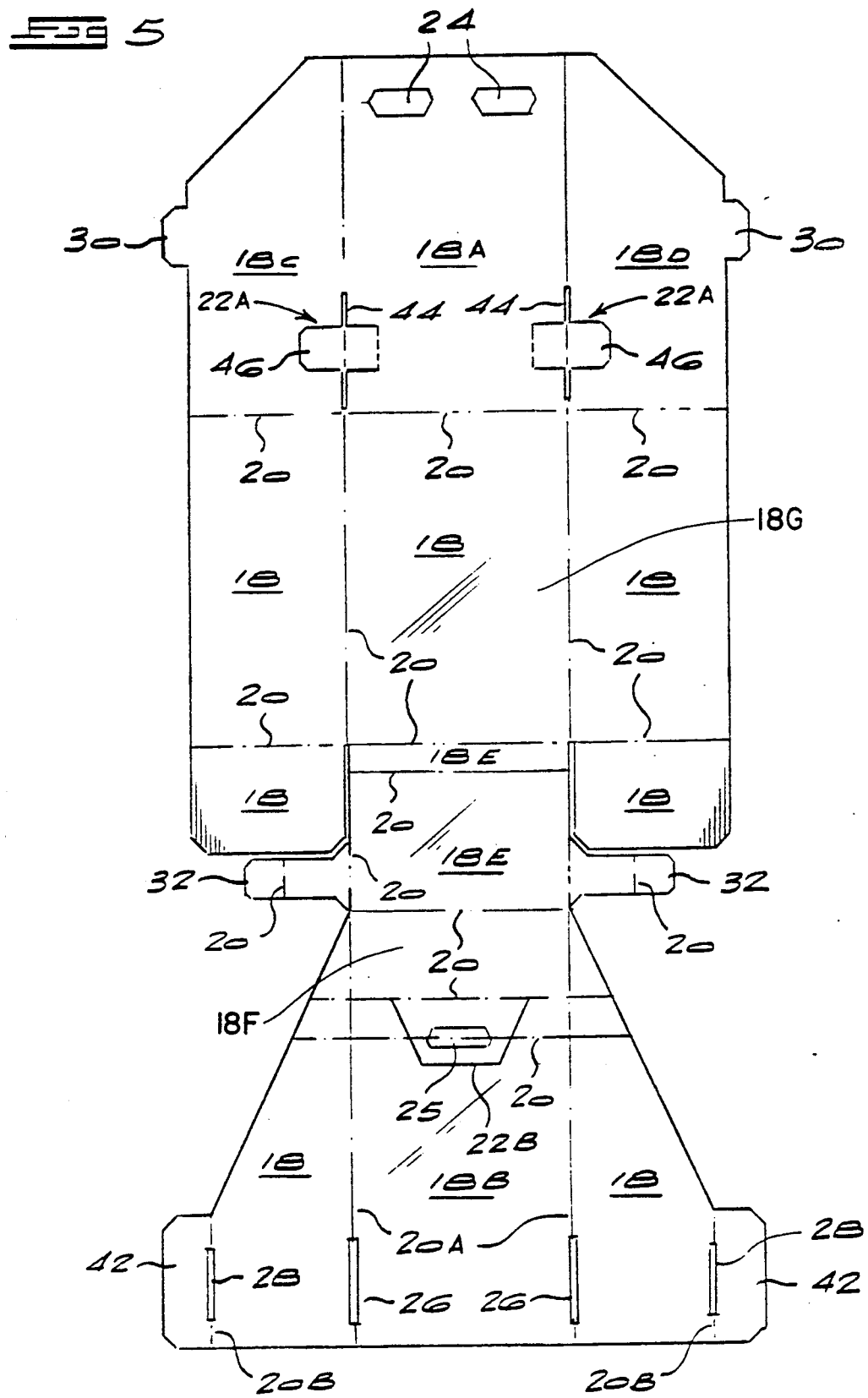

TROLLEY

BACKGROUND TO THE INVENTION

This invention relates to a trolley.

A major problem faced by shopping centre operators is theft of shopping trolleys. Such thefts can often be attributed to the actions of unscrupulous shoppers faced with a long walk carrying a heavy burden of shopping bags.

It is accordingly an object of the present invention to provide a trolley that can be used for shopping and other purposes and which is relatively inexpensive.

SUMMARY OF THE INVENTION

A first aspect of the invention provides a trolley comprising a collapsible structure, the structure comprising a series of rigid or semi-rigid planar panels which are foldable relative to one another between a collapsed state in which at least the majority of the panels lie in a coplanar, compact relationship and an erected state in which the panels define a box for accommodating articles to be transported, wheels connected to the structure for supporting the box in wheeled fashion when the panels are folded relative to one another to their erected state, and means for holding the panels releasably in their collapsed and erected states.

The trolley may have first handle means to facilitate carrying of the trolley when the panels are in their collapsed state, and second handle means to facilitate steering of the trolley when the panels are in their erected state.

The means for holding the panels releasably in their respective states may in one embodiment comprise foldable tabs which form part of the collapsible structure and which are engageable in appropriately positioned slots in the structure when the panels are folded relative to one another to their collapsed state or their erected state.

Preferably, the panels define an open-topped box when folded relative to one another to their erected state. In this case, the structure may include a planar panel capable of acting as a pivoted lid for opening and closing the open top of the box.

Conveniently, the structure is formed integrally from corrugated cardboard which may be treated to render it water-resistant. Alternative materials are also possible. For instance, the structure may be formed integrally from plastics material. In this case, at least some of the planar panels have an open grid construction.

According to a preferred feature of the invention the trolley comprises a pouch for containing a waterproof cover locatable over the box.

Another aspect of the invention provides a one piece blank adapted to form the structure of a trolley as summarised above.

BRIEF DESCRIPTION OF THE DRAWINGS

The invention will now be described in more detail, by way of example only, with reference to the accompanying drawings in which:

FIG. 1 shows a perspective view of a trolley of the invention in the collapsed state;

FIGS. 2 and 3 illustrate different stages during erection of the trolley from the collapsed state of FIG. 1;

FIG. 4 shows the fully erected trolley ready for use; and

FIG. 5 shows a blank used to form the trolley.

DESCRIPTION OF THE PREFERRED EMBODIMENT

The illustrated trolley 10 has a collapsible structure 12 and a wheeled axle 14 as its major components.

FIG. 5 shows a one-piece, corrugated cardboard blank 16 which forms the structure 12. The blank 16 is composed of a series of planar panels 18 which can be folded relative to one another about fold lines 20 indicated by chain-dot lines in the illustration. Cuts which extend right through the thickness of the cardboard are indicated by the numeral 22.

Elongate openings 24 are cut out of an end panel designated 18A, and a further elongate opening 25 is cut out of another of the panels designated 18B. Pairs of elongate slots 26 and 28 are formed on the fold lines designated 20A and 20B.

The planar panels designated 18C and 18D carry projecting tabs 30. Further tabs 32 project from opposite sides of the panel designated 18E. Panel 18E provides bottom wall 17 as shown in FIG. 2.

The wheeled axle 14 includes a rigid steel axle 36 and a pair of wheels 38 supported rotatably on the ends of the axle. The axle extends through a corrugated cardboard tube 40 which is glued or otherwise fixed to the underside of the narrow panel designated 18F, with the wheels then being located at opposite ends of the panel 18F.

FIG. 1 shows the trolley 10 in its fully collapsed state. In this state, the majority of the panels 18 are coplanar with one another to form a very compact arrangement convenient for storage in a cupboard or the like when the trolley is not in use. The collapsed state is maintained by the tabs 32 which extend about the sides of the collapsed structure and engage frictionally in the slots 26.

FIGS. 2 and 3 show different, intermediate stages in the conversion of the structure 12 from its collapsed to its erected state. Referring firstly to FIG. 2, the structure 12 is rolled out after the tabs 32 have been released from the slots 26. Thereafter, various folding steps, the nature and sequence of which will be readily evident from FIGS. 2 and 3, are carried out. Once the FIG. 3 stage is reached, the panel 18B is folded in the manner indicated by the arrow 40 and the tabs 30 are engaged in the slots 26. Next, tabs 42 defined by the fold lines designated 20B are folded and inserted into slots 44 defined by an arrangement of cut lines designated 22A. Thereafter locking tabs 46, also defined by the arraignment of cut lines designated 22A, are engaged frictionally in the slots 28. The combination of engaging tabs 42 and 46 in their respective slots results in a firm anchorage of the panels in the erected state illustrated in FIG. 4.

Referring now to FIG. 4, it will be seen that the openings 24 in the panel 18A provide handles 50 which can easily be gripped by a user of the trolley to facilitate propulsion and steering of the trolley. The various panels 18 define an open-topped rectangular box 52 in which articles such as shopping bags and the like can be placed for transportation. Once the articles have been unloaded from the box at their destination, the box is knocked down to the state illustrated in FIG. 2. Thereafter the panels are folded up relative to one another, by a rolling type action depicted by the arrow 60, to return them to the compact, collapsed state of FIG. 1. As illustrated by FIG. 1, the formation 62 which includes the opening 25 and which is defined by the cut line designated 22B forms a carrying handle 64, enabling the collapsed trolley to be carried about when not in use in the manner of a briefcase.

The erected box seen in FIG. 4 is of rectangular shape and has a front wall 11, a rear wall 13, side walls 15 and a bottom wall 17. The front wall 11 is made up of the panels 18B and 18F, separated from one another by the relevant fold line 20, while the rear wall 13 is made up of the panels 18A and 18G, once again separated by a fold line 20. From a study of FIGS. 3 and 4 it will be observed that the fold lines 20 are different elevations above the bottom wall 17, so that the box has considerable rigidity.

It will be appreciated that the bottom of the erected box 52 is formed by a double thickness of the corrugated cardboard, giving it substantial strength against rupturing under the loads imposed on it by articles placed in the box for transportation. Also the sides 66 of the box are composed at least in part of a double thickness of corrugated cardboard, thus giving the box resistance to bending forces arising by virtue of the load carried therein.

The corrugated cardboard which is used will be fairly thick to improve the load-carrying capabilities of the trolley. However, as an alternative to cardboard, it is also possible to make the blank of injection moulded plastics material. In this case, to save costs it may be preferred to make at least some of the panels in the form of open-grid plastics structures.

When cardboard is used the danger exists that water due to rain or other sources may cause the cardboard to become soggy and to lose its strength. In this case, it is preferred to treat the cardboard to improve its resistance to water. This may be done using any one of a number of commercially available waterproofing resins sprayed or otherwise applied to the cardboard. An alternative is to provide a pouch 70, as seen in FIG. 4, for accommodating a large plastics bag, typically a bag of the kind commonly used for house hold refuse. In the event of rainfall, the user merely withdraws the bag and inverts it over the box to protect both the contents of the box and the cardboard itself.

In addition to this, a closure can be provided for the open top of the box 52. This closure can take the form of a flap (not shown) pivoted to the panel 18A. When in use, the flap is pivoted to a position in which it rests upon the edge 74 of the box. When not required, the flap is forced over the edge 74 and is pivoted back into the box so as to lie parallel to the panel 18A.

It will be appreciated that the erected trolley can stand unsupported on its wheels and on the corner 76 of the box 52. To protect the corner from damp ground conditions, projecting studs 78 can be provided adjacent this corner to rest on the ground.

I claim:

1. A trolley comprising a collapsible structure, the structure comprising a series of rigid or semi-rigid planar panels which are foldable relative to one another between a collapsed state in which at least the majority of the panels lie in a coplanar, compact relationship and an erected state in which the panels define a box for accommodating articles to be transported. wheels connected to the structure for supporting the box in wheeled fashion when the panels are folded relative to one another to their erected state. and means for holding the panels releasably in their collapsed and erected states, said box in its erected state has a rectangular cross-section and is defined by a bottom, opposed front and rear walls and opposed side walls, the front and rear walls each being made up of a plurality of coplanar, rectangular panels with fold lines between adjacent panels, the fold lines in the front and rear walls being at different elevations above the bottom wall of the box.

2. A trolley according to claim 1 and comprising first handle means to facilitate carrying of the trolley when the panels are in their collapsed state.

3. A trolley according to claim 2 wherein the first handle means comprises a hand-engageable, holed tab adapted to stand proud of the structure when the panels are in their collapsed state.

4. A trolley according to claim 3 and comprising second handle means to facilitate steering of the trolley when panels are in their erected state.

5. A trolley according to claim 4 wherein the second handle means is provided by laterally spaced openings formed in the rear wall of the box.

6. A trolley according to claim 1 wherein the means for holding the panels releasably in their respective states comprises foldable tabs, formed in one piece with the panels which are engageable in appropriately positioned slots in the structure when the panels are folded relative to one another to their collapsed state or their erected state.

7. A trolley according to claim 1 wherein the panels define an open-topped box when folded relative to one another to their erected state.

8. A trolley according to claim 7 wherein the structure includes a planar panel capable of acting as a pivoted lid for opening and closing the open top of the box.

9. A trolley according to claim 1 wherein the structure is formed in one piece from corrugated cardboard.

10. A trolley according to claim 9 wherein the cardboard is treated to render it water-resistant.

11. A trolley according to claim 1 wherein the structure is formed in one piece from plastics material.

12. A trolley according to claim 11 wherein at least some of the panel panels have an open grid construction.

13. A trolley according to claim 1 wherein the wheels are mounted on an axle which is secured to the structure.

14. A trolley according to claim 13 wherein the axle passes through a tubular member secured to the structure.

15. A trolley according to claim 1, wherein the panels making up the front and rear walls, and the fold lines between adjacent opens of those panels, are so arranged that the structure is unfolded by a rolling action in order to bring the panels from the collapsed state to the erected state, and is folded by an opposite rolling action to bring the panels from the erected state to the collapsed state.

16. A trolley according to claim 15, wherein the height of the structure in the collapsed state of the panels is less than that of the structure in the erected state.

* * * * *